United States Patent [19]
Niebylski

[11] Patent Number: 5,198,488
[45] Date of Patent: Mar. 30, 1993

[54] PRECERAMIC COMPOSITIONS AND CERAMIC PRODUCTS WITH SILICON BORIDE

[75] Inventor: Leonard M. Niebylski, Baton Rouge, La.

[73] Assignee: Ethyl Corporation, Richmond, Va.

[21] Appl. No.: 261,612

[22] Filed: Oct. 24, 1988

Related U.S. Application Data

[63] Continuation-in-part of Ser. No. 151,272, Feb. 1, 1988, abandoned.

[51] Int. Cl.$^5$ .......................... C08K 3/38; B32B 9/09
[52] U.S. Cl. .................................. 524/404; 525/474; 428/446
[58] Field of Search .............. 419/2; 428/446; 556/441; 525/474; 528/10; 524/404

[56] References Cited

U.S. PATENT DOCUMENTS

| | | | |
|---|---|---|---|
| 3,962,299 | 6/1976 | Stackman | 556/441 |
| 4,397,828 | 8/1983 | Seyferth et al. | 423/344 |
| 4,482,669 | 11/1984 | Seyferth et al. | 524/442 |
| 4,482,689 | 11/1984 | Haluska | 528/25 |
| 4,645,807 | 2/1987 | Seyferth et al. | 525/474 |
| 4,650,837 | 3/1987 | Seyferth et al. | 525/478 |
| 4,659,850 | 4/1987 | Arai et al. | 556/409 |
| 4,718,941 | 1/1988 | Halverson et al. | 75/236 |

*Primary Examiner*—Peter A. Nelson
*Attorney, Agent, or Firm*—Patricia J. Hogan

[57] ABSTRACT

Preceramic compositions which have particular utility in providing protective ceramic coatings on carbon/carbon composites, graphite, carbon fibers, and other normally oxidizable materials are prepared by dispersing about 0.1-4 parts by weight of silicon boride in one part by weight of a polysilazane in solution in an organic solvent.

14 Claims, No Drawings

PRECERAMIC COMPOSITIONS AND CERAMIC PRODUCTS WITH SILICON BORIDE

CROSS-REFERENCE TO RELATED APPLICATION

This application is a continuation-in-part of copending application Ser. No. 151,272, filed Feb. 1, 1988, and now abandoned.

FIELD OF INVENTION

This invention relates to ceramic materials derived from polysilazanes and more particularly to such materials which are useful in protecting substrates that are normally susceptible to oxidative deterioration.

BACKGROUND

It is known that many materials, such as carbon/carbon composites, carbon fibers, graphite, and certain metals have properties which make them attractive for use in aerospace and other applications in which their susceptibility to oxidative deterioration at elevated temperatures is a serious disadvantage. It would be desirable to find a means of protecting those materials from oxidation at high temperatures, and it has been proposed to provide such protection with ceramic coatings. However, known ceramic coatings have proved to be inadequate.

As disclosed in U.S. Pat. No. 4,397,828 (Seyferth et al.-I) U.S. Pat. No. 4,482,669 (Seyferth et al.-II), U.S. Pat. No. 4,645,807 (Seyferth et al.-III), U.S. Pat. No. 4,650,837 (Seyferth et al.-IV), and U.S. Pat. No. 4,659,850 (Arai et al.), it is known that ceramics can be obtained from polysilazanes. U.S. Pat. No. 4,482,689 (Haluska) discloses boron-containing metallosilazane polymers which are also useful in forming ceramic materials.

SUMMARY OF INVENTION

An object of this invention is to provide novel polysilazane compositions.

Another object is to provide such compositions which can be converted to ceramic coatings capable of protecting oxidizable substrates from oxidative deterioration at elevated temperatures.

A further object is to provide ceramic composition having high thermal stability.

These and other objects are attained by intimately dispersing about 0.1–4 parts by weight of silicon boride in one part by weight of a polysilazane in solution in an organic solvent and, when desired, applying the dispersion to or infiltrating it into a substrate, removing any solvent, and heating to form a ceramic.

DETAILED DESCRIPTION

The polysilazane used in the practice of the invention may be any polysilazane that is soluble in common organic solvents, such as aliphatic or aromatic hydrocarbons, dialkyl or alicyclic ethers, etc.; and it may be, e.g., a polysilazane of Seyferth et al.-I, Seyferth et al.-II, Seyferth et al.-III, Seyferth et al.-IV, or Arai et al., the teachings of all of which are incorporated herein in toto by reference. However, it is preferably a polysilazane of the type taught by Seyferth et al.-II, i.e., a polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent, a mixture of such polysilazanes, or alternatively, an oligomeric ammonolysis product formed as an intermediate in the process of Seyferth et al.-II and isolated as in Seyferth et al.-I. For example, it may be one or more polysilazanes prepared by reacting methyldichlorosilane with ammonia, treating the ammonolysis product with potassium hydride, and quenching the resultant product with methyl iodide or dimethylchlorosilane; or it may be one or more polysilazanes prepared by reacting methyldiclorosilane with ammonia and isolating the ammonolysis product.

The silicon boride may be silicon tetraboride or silicon hexaboride, each of which is normally contaminated with at least small amounts of the other as supplied commercially. The commercial materials are satisfactory. It is preferred that the silicon boride have an average particle size of about 1–2 micrometers to facilitate the formation of a homogeneous dispersion. Finer and coarser particles are also utilizable, but the dispersions formed from them are less homogeneous when the average particle size is much larger than about 1–2 micrometers, e.g., when it is about 10–20 micrometers. The amount of silicon boride employed is about 0.1–4, preferably about 0.4–1.5, parts per part by weight of the polysilazane.

To prepare the dispersions of the invention, the silicon boride is dried and then intimately mixed with the polysilazane solution. In a preferred embodiment of the invention in which the process is conducted so as to form a dispersion that is directly utilizable as a coating composition, a polysilazane solution is used that is a clear solution; and the amount of solvent employed is such as to provide a solids content of about 5–75%, preferably about 30–60% by weight in the dispersion.

When a solvent is employed for the polysilazane, it may be any suitable organic solvent, such as hexane, heptane, and other aliphatic hydrocarbons; benzene, toluene, xylene, and other aromatic hydrocarbons; cyclohexanone, 1-methyl-2-pyrrolidone, and other ketones; etc.

The dispersions of the invention are preceramic materials which are useful for making ceramic flakes, powders, films, coatings, slabs, structural composites, and other shaped articles; and, like other preceramic materials, they may be used in combination with other ingredients, such as ceramic powders or whiskers, etc., when appropriate.

An application in which they find particular utility is as coating compositions for normally oxidizable materials, especially those which need protection from oxidative deterioration at elevated temperatures. (Such materials include, e.g., fibers, tows, hanks, mats, and composites of carbon; carbon or graphite slabs, rods, and structures; and oxidizable metals, such as magnesium, aluminum, silicon, niobium, molybdenum, lanthanum, hafnium, tantalum, tungsten, titanium, and the metals of the lanthanide and actinide series.) When used in such an application in which the substrate is porous, the compositions can also serve as infiltrants when they are relatively dilute; and infiltration can be prevented or minimized by using more concentrated coating compositions.

In addition to providing protection from oxidative deterioration, the coating compositions can also serve to improve the physical properties and thermal stability of substrates, such as those mentioned above, silica foams, ceramic cloths (e.g., cloths formed from alumina, silica, and/or lithia), etc.

The coating compositions are also useful for patching ceramic coatings formed from the same or different formulations.

Another particularly notable utility of the compositions is as adhesive compositions which can be coated onto one or both of two surfaces to be adhered and then dried and pyrolyzed to form a ceramic bond.

When the compositions are to be used to provide protective ceramic coatings on substrates, the surfaces to be coated are usually cleaned prior to the application of the coating composition in order to improve the bonding of the ceramic coating to the substrate. The bonding can sometimes be further improved by pre-etching the surfaces to be coated.

As indicated above, the preceramic coating compositions of the invention are dispersions having solids contents of about 5–75%, preferably about 30–60% by weight. These dispersions may be applied to the substrates in any suitable manner, such as by spraying, swabbing, or brushing, to form coatings having the desired thickness, generally a thickness of up to about 1000 micrometers, frequently a thickness of about 10–250 micrometers. Because of the porosity of coatings derived from the dispersions, it is important that the ultimate thickness be provided by applying the preceramic coating composition in at least two thinner layers, e.g., by applying the coating composition in layers of about 25–100 micrometers, each layer being dried by driving off the solvent before the next layer is applied.

When temperatures as high as about 200°–250° C. are used to drive off high boiling solvents, some pyrolysis of the preceramic polymer is initiated during the drying of the coating composition. However, higher temperatures, i.e., about 675°–900° C., preferably about 825°–875° C., are required to convert the preceramic coating to a ceramic coating. This pyrolysis may be delayed until the final desired thickness of preceramic coating has been deposited. However, it is generally preferred to pyrolyze each one or two layers of dried preceramic coating before applying the next layer of coating composition. The time required for the pyrolysis is generally about 1–60 minutes, depending on the particular pyrolysis temperature selected. In the preferred embodiment of the invention where the coating is applied in multiple layers, each one or two of which is pyrolyzed before the application of the next layer, and the pyrolysis temperature is about 825°–875° C., it is generally preferred to pyrolyze the first coat for only about five minutes and then to pyrolyze subsequent coats for longer times up to about 15 minutes.

When the coating is intended to protect a substrate from oxidative deterioration at very high temperatures, e.g., temperatures higher than 800° C., each pyrolysis is followed by thermal treatment of the coated substrate at about 1075°–1250° C., preferably about 1100°–1175° C., most preferably about 1125° C., in an atmosphere containing not more than a minor amount of oxygen, e.g., in a nitrogen, argon, or helium atmosphere. This treatment may be accomplished by raising the temperature in the vessel used for the pyrolysis or by transferring the coated substrate to a vessel maintained at the higher temperature; and it is preferably continued for about five minutes for the first coat and longer periods, e.g., about 15–20 minutes, for subsequent coats.

After each pyrolysis or pyrolysis/heat treatment step employed in providing a ceramic coating, the coated substrate is cooled. Optimum results are attained when this cooling is accomplished at a rate not greater than about 50° C./minute, preferably about 20°–30° C./minute, until the substrate temperature is below 500° C., at which time further cooling may be accomplished at ambient air temperature.

It is not essential but preferred to keep the starting polysilazane and the dispersion formed from it in a dry atmosphere until a layer of ceramic has been formed because of the susceptibility of the preceramic materials to attack by water and other compounds having active hydrogens.

As already indicated, the dispersions of the invention are useful in preparing a variety of ceramic objects, but the major advantage of the invention is its provision of compositions capable of protecting normally oxidizable materials from oxidative deterioration at elevated temperatures. This advantage is of particular importance in the protection of carbon/carbon composites, graphite, carbon fibers, and metals used in aerospace applications, such as engine components, advanced nozzle system components, and high-temperature vehicle structures.

The following examples are given to illustrate the invention and are not intended as a limitation thereof.

EXAMPLE I

Synthesis of Polysilazane

Part A

A suitable reaction vessel was charged with 14L of anhydrous tetrahydrofuran and cooled to about 0° C., after which 1545 g (13.43 mols) of methyldichlorosilane was added to the vessel, and stirring at about 60 rpm was begun. A slow steady stream of 1058 g (62.12 mols) of anhydrous ammonia gas was introduced into the vessel at a flow rate such that the reaction pressure was maintained at or below 400 kPa, and the reaction temperature stayed in the range of 0°–10° C. Then the reaction mixture was stirred at 0° C. for about three hours, after which the coolant flow on the vessel was shut off, and the system was put under gentle nitrogen purge to allow the reaction mass to warm to room temperature and the majority of the excess ammonia to vent off. Then the reaction vessel was pressurized with sufficient nitrogen gas to pump the product mass through a bag filter assembly into a holding tank, where it was verified that the filtrate solution was free of particulates.

Part B

The clear filtrate from Part A was discharged into a polymerization vessel and chilled to about 0° C., and a suspension of 3.6 g (0.089 mol) of potassium hydride powder in about 100 mL of anhydrous tetrahydrofuran was added to begin the polymerization reaction. The reaction mixture was maintained at 0° C. for about 8 hours and then allowed to warm gradually to about 22° C. After a total of about 26 hours of polymerization at 0°–22° C., the reaction was quenched by adding about 12.6 g (0.13 mol) of dimethylchlorosilane to the polymerization solution.

The polymer product was isolated by (1) concentrating the product solution to about 4L of volume by vacuum distillation, (2) centrifuging the concentrated solution to obtain a clear supernatant solution and a white precipitate, (3) decanting off the supernatant solution from the precipitate, and (4) flashing off the volatiles from the supernatant solution by vacuum distillation to provide a white solid. Proton NMR spectra of the polymer in deuterated chloroform solvent had resonances consistent with those reported in Seyferth et al.-II for polysilazane and with the presence of a small amount, i.e., 2.4% by weight, of residual tetrahydrofuran.

EXAMPLE II

Graphite coupons having nominal dimensions of about 3.8 cm×2.5 cm×0.3 cm were abraded to provide a smooth finish, cleaned, vacuum dried, and thoroughly swab-coated in an inert atmosphere with a dispersion of 50 parts by weight of an 80/20 mixture of silicon hexaboride and silicon tetraboride in a solution of 50 parts by weight of the polysilazane of Example I in a 7/1 mixture of xylene and 1-methyl-2-pyrrolidone. The coating was dried, heated at 100° C. for five minutes, heated to 150° C. at a rate of about 10° C./minute, held at 150° C. for 15-30 minutes, allowed to cool to room temperature, recoated and held at 150° C. for 30 minutes, heated to about 175°-186° C., maintained at that temperature for at least 15 minutes, and cooled to provide coupons having a coating thickness of about 0.08-0.1 mm.

The coatings were then pyrolyzed to ceramic coats by heating the coated coupons to 165° C. at a rate of 5° C./minute, holding at 165° C. for 15 minutes, heating to 285° C. at a rate of 5° C./minute, holding at 285° C. for 30 minutes, heating to 850° C. at a rate of 100° C./minute, holding at 850° C. for 15 minutes, heating to 1250° C., holding at 1250° C. for 15 minutes, and cooling to room temperature.

The effectiveness of the ceramic coats thus obtained in protecting the graphite substrate from oxidation was determined by an oxidation test. The coated specimen was mounted horizontally in a half section of a silicon carbide tube which was used as a holder and which allowed over 99% of the coupon surface to be directly exposed to hot ambient convecting air. The holder and specimen were placed in a box furnace which had been preheated to 650° C. Every 3-4 hours the holder and specimen were removed from the furnace and quenched in ambient air, the cooled specimen was weighed and remounted in its holder, and the holder and specimen were replaced in the heated furnace for additional heating in air. After 24 hours the oxidation weight loss was only 2.2-8.1%. This compares with an oxidation weight loss of 98-100% after 24 hours when uncoated graphite coupons were subjected to the same oxidation test.

EXAMPLE III

Example II was essentially repeated except that the test temperature was 815° C. instead of 650° C. The oxidation weight loss after 24 hours was 10-19%, which compares with an oxidation weight loss of 100% after 24 hours when uncoated graphite coupons were subjected to the same test.

EXAMPLE IV

Example II was essentially repeated except that the test temperature was 1505° C. instead of 650° C. and the specimens were removed from the furnace every 20 minutes instead of every 3-4 hours. The oxidation weight loss was 0.06-0.18% after one hour and 0.4% after 6 hours. This compares with an oxidation weight loss of 100% after one hour when uncoated graphite coupons were subjected to the same test.

EXAMPLE V

Example II was essentially repeated except that the coupons that were coated with the dispersion were uninhibited carbon/carbon composite coupons having nominal dimensions of about 2.5 cm×2.5 cm×0.3 cm which were cleaned, abraded, cleaned again, etched with nitric and hydrofluoric acids, recleaned, and dried before being coated. The oxidation weight loss after 24 hours was 10-13%. This compares with an oxidation weight loss of 52-78% after 24 hours when uncoated carbon/carbon composite coupons were subjected to the same test.

EXAMPLE VI

Example V was essentially repeated except that the test temperature was 815° C. instead of 650° C. The oxidation weight loss after 24 hours was 12-21%, which compares with an oxidation weight loss of 100% after 24 hours when uncoated carbon/carbon composite coupons were subjected to the same test.

EXAMPLE VII

Example V was essentially repeated except that the test temperature was 1505° C. instead of 650° C. and the test specimens were removed from the furnace every 20 minutes instead of every 3-4 hours. The oxidation weight loss after one hour was 0.2-0.3%, which compares with an oxidation weight loss of 100% after one hour when uncoated carbon/carbon composite coupons were subjected to the same test.

EXAMPLE VIII

Example II was essentially repeated except that the coupons that were coated with the dispersion were inhibited carbon/carbon composite coupons (i.e., carbon/carbon composite coupons containing an oxidation inhibitor) having nominal dimensions of about 2.5 cm×2.5 cm×0.34 cm which were pretreated as in Example V before being coated. The oxidation weight loss after 24 hours was 0.8-4.5%. This compares with an oxidation weight loss of 15-17% after 24 hours when uncoated inhibited carbon/carbon composite coupons were subjected to the same test.

EXAMPLE IX

Example VIII was essentially repeated except that the test temperature was 815° C. instead of 650° C. The oxidation weight loss after 24 hours was 2.2-6.1%, which compares with an oxidation weight loss of 63% when uncoated inhibited carbon/carbon composite coupons were subjected to the same test.

EXAMPLE X

Example VIII was essentially repeated except that the test temperature was 1505° C. instead of 650° C. and the test specimens were removed from the furnace every 20 minutes instead of every 3-4 hours. The oxidation weight loss was 0.16-0.3% after one hour and 0.2-0.3% after 6 hours. This compares with an oxidation weight loss of 70% after one hour when uncoated inhibited carbon/carbon composite coupons were subjected to the same test.

It is obvious that many variations can be made in the products and processes set forth above without departing from the spirit and scope of this invention.

What is claimed is:

1. An intimate dispersion of about 0.1–4 parts by weight of silicon boride in one part by weight of a polysilazane in solution in organic solvent.

2. The dispersion of claim 1 which contains about 0.4–1.5 parts by weight of silicon boride per part by weight of polysilazane.

3. The dispersion of claim 1 wherein the silicon boride is at least predominantly silicon hexaboride.

4. The dispersion of claim 1 wherein the silicon boride is at least predominantly silicon tetraboride.

5. The dispersion of claim wherein the silicon boride has an average particle size of about 1–2 micrometers.

6. The dispersion of claim 1 wherein the polysilazane is a polymer prepared by reacting an organodihalosilane with ammonia, treating the ammonolysis product with a basic catalyst which is capable of deprotonating an NH group that is adjacent to an SiH group, and quenching the resultant product with an electrophilic quenching reagent.

7. The dispersion of claim 6 wherein the organodihalosilane is methyldichlorosilane, the basic catalyst is potassium hydride, and the quenching reagent is dimethylchlorosilane.

8. The dispersion of claim 1 wherein the silicon boride is dispersed in an organic solvent solution of the polysilazane.

9. The dispersion of claim 8 having a solids content of about 5–75% by weight.

10. The dispersion of claim 9 wherein the solids content is 30–60% by weight.

11. A 30–60% solids content intimate dispersion of silicon boride having an average particle size of about 1–2 micrometers in a solution of a polysilazane in an organic solvent, there being present 0.4–1.5 parts by weight silicon boride per part of polysilazane; the polysilazane being a polymer prepared by reacting methyldichlorosilane with ammonia, treating the ammonolysis product with potassium hydride, and quenching the resultant product with dimethylchlorosilane.

12. An article which comprises a substrate that is normally susceptible to oxidative deterioration and a preceramic coating derived from the dispersion of claim 1.

13. An article which comprises a substrate that is normally susceptible to oxidative deterioration and a ceramic coating provided by (1) coating the substrate with a 5–75% solids intimate dispersion of about 0.1–4 parts by weight of silicon boride in a solution of one part by weight of a polysilazane in an organic solvent, (2) drying the coating, (3) heating the coated article in an inert atmosphere at a temperature of about 675°–900° C. until the coating is converted to a ceramic, (4) then heating the coated substrate at a temperature of about 1075°–1250° C., (5) cooling the coated substrate, and (6) repeating steps 1–5 at least once.

14. A ceramic derived from the dispersion of claim 1.

* * * * *